United States Patent Office 3,730,688
Patented May 1, 1973

3,730,688
INDICATOR FOR THE DETECTION OF NICKEL IONS

Dieter Schmitt, Alfred Stein, and Wilhelm Baumer, Darmstadt, Germany, assignors to Merck Patent Gesellschaft mit beschrankter Haftung, Darmstadt, Germany
No Drawing. Filed Mar. 9, 1971, Ser. No. 122,541
Claims priority, application Germany, Sept. 3, 1970,
P 20 43 600.4
Int. Cl. G01n 31/22
U.S. Cl. 23—253 TP                             15 Claims

ABSTRACT OF THE DISCLOSURE

An indicator for the colorimetric detection of nickel ions is formed by impregnating an absorbent carrier with a composition comprising dimethylglyoxime, an alkali-metal or ammonium thiosulfate, alkali metal fluoride, a buffer and, optionally, hydroxylammonium chloride.

BACKGROUND OF THE INVENTION

This invention relates to an indicator and process for the colorimetric determination of nickel ions and methods for the production thereof.

In analytical chemistry, the use of identification reagents for the colorimetric determination of certain metal ions has become increasingly important. Test papers for the detection of nickel ions are well known. These test papers are usually impregnated with dimethylglyoxime, resulting in the formation of a pink color with the nickel (II) ions present in the solution being tested. However, there are several drawbacks in the use of these conventional indicators which make semi-quantitative determinations with such indicators impossible. For example, copper (II) ions interfere by producing a green to brown color, and iron (III) ions also interfere by producing a brown color, thus obliterating the pink coloring resulting from the nickel ions. In addition, as the testing solution penetrates the paper, a concentration gradient is produced, thereby making a semi-quantitative determination of the nickel ions present impossible. Another important drawback is that the color produced in the presence of nickel ions is directly influenced by the pH of the solution being tested. Consequently, the field of application of this conventional indicator is very limited.

There thus remains a need for an indicator composition and a process for effectively and efficiently performing both qualitative and semi-quantitative tests on a nickel containing solution which can be carried out in a very short period of time and which do not exhibit the aforementioned disadvantages of conventional indicators.

OBJECTS OF THE INVENTION

It is an object of this invention to provide a novel indicator for the detection of nickel ions. It is another object to provide novel composition for the semi-quantitative determination of nickel ions. Another object is to provide an indicator which is suitable for performing both quantitative and qualitative tests which are not affected by the pH of the solution to be tested. A further object of the invention is the provision of an indicator which is not affected by copper (II) and iron (III) ions in the solution being tested. Other objects will be apparent to those skilled in the art to which this invention pertains.

SUMMARY OF THE INVENTION

The indicators of this invention comprise:
(a) dimethylglyoxime;
(b) an alkali metal or ammonium thiosulfate;
(c) an alkali metal fluoride;
(d) a buffer agent; and,
(e) optionally, hydroxylammonium chloride.

DETAILED DISCUSSION

According to one embodiment of this invention, an absorbent carrier is impregnated with an indicating composition of this invention, which ensures identical readings of the nickel ions present in a test solution because identical colorings of the indicator are obtained independent of the pH of the solutions being examined. Furthermore, the maximum color depth is produced within a very short period of time and remains constant for a long period, so that a comparison with a color scale can be easily carried out. Thus, it is possible to conduct semi-quantitative tests to determine the amount of nickel ions present in a particular solution. In addition, a linear correlation between the nickel ion concentration of the test solution and the resultant color depth is unexpectedly obtained with the novel indicator compositions of this invention.

The dimethylglyoxime is present in an amount sufficient to ensure conversion of all nickel ions present in the test solution to a colored reaction product. The exact amount required will, of course, depend upon the volume of test liquid applied to the reagent composition and the nickel concentration thereof. When the reagent composition is absorbed on an absorbent carrier, a concentration of about 0.1 to 1%, preferably about 0.4 to 0.8%, in the solution thereof applied to the absorbent carrier will suffice to react with all the nickel ions in test solutions which would normally thereafter be applied to the absorbent carrier impregnated with the reagent composition.

In order to obtain a semi-quantitative determination of all of the nickel ions in the test solution, any $Cu^{++}$ and iron ions therein must be masked. An alkali metal thiosulfate, preferably sodium thiosulfate, is employed to mask the copper ions and an alkali metal fluoride, preferably potassium fluoride, is employed to mask the iron ions. In order to obtain a semi-quantitative result, the amount of thiosulfate and fluoride salts which should be present in the reagent composition should be sufficient to react with all of the $Cu^{++}$ and iron ions present in any test solution. The exact amount will depend on the volume and $Cu^{++}$ and/or iron content of the test solutions contacted with the reagent. When the reagent composition is absorbed on an absorbent carrier, to ensure complete reaction with the copper and iron ions of any test solution which would normally be applied thereto, the impregnating composition for the absorbent carrier should contain 5 to 12%, preferably 8 to 12% of the thiosulfate salt and 3 to 8%, preferably 6 to 7% of the fluoride salt.

The composition of this invention also comprises a buffer agent. A buffer is employed which will ensure that the complexing of nickel ions occurs at a mildly acidic to nearly neutral pH, e.g., from 2 to 7, the optimum pH range being about 6, e.g., about 5 to 6.5. When the pH range of the test solution is from 2 to 7, the accuracy of the reagent composition is independent of the pH of the solution to be tested. Suitable buffers include conventional buffer agents. These agents are advantageously employed in forming the novel reagent composition at a concentration of at least 0.1 M or 5 to 20%, preferably 10 to 15%, of the composition. Conventional buffers which can be employed include, for example, weak organic acids, e.g., tartaric acid, citric acid, malic acid, malonic acid, succinic acid, maleic acid, and the alkali salts thereof; inorganic weak acids, e.g., phosphoric acid and boric acid, and the alkali salts thereof. It is also possible to prepare any desired mixture of such buffer agents. The desired pH is normally adjusted by adding an aqueous alkali hydroxide solution, preferably NaOH, to the impregnating solution.

The indicators of this invention optionally contain hydroxylammonium chloride. Surprisingly, the pink coloring of the indicator is much more clearly pronounced when hydroxylammonium chloride is present in the solution. Another advantage provided by the addition of hydroxylammonium chloride to the impregnating solutions for the indicators of this invention is that it is present in an amount sufficient to exert a stabilizing effect on thiosulfate. In addition, any interfering iron (III) ions, which may be present in the solution, are reduced by the hydroxylammonium chloride. Generally, the amount of hydroxylammonium chloride which will be employed will be about 0–3%, preferably about 1 to 2%.

To prepare a test indicator of this invention, an absorbent carrier is impregnated with a solution or solutions comprising the following ingredients:

(a) 0.1–1% dimethylglyoxime;
(b) 5–12% alkali-metal thiosulfate;
(c) 3–8% alkali-metal fluoride;
(d) 5–20% buffer; and
(e) 0–3% hydroxylammonium chloride.

Suitable absorbent carriers include those which are normally used in combination with identification reagents. Filter paper is preferred. It is also possible to employ other forms of absorbent cellulose and cellulose derivatives and adsorbent plastic products, e.g., sheets of polyester fiber and fiber glass laminate.

According to a preferred embodiment of the invention, the absorbent carrier is impregnated successively with at least two different solutions, since dimethylglyoxime is only slightly soluble in water whereas the remaining components can readily be applied from an aqueous solution. In this preferred embodiment, one of the impregnating solutions can contain components (b), (c), (d) and (e) and the other can contain component (a). When the impregnation is conducted with separate solvent solutions, it is, of course, necessary to dry the absorbent carrier between the impregnating steps. Thus, for example, components (b) and (c) can separately be applied in the form of an aqueous solution and component (a) can be applied in the form of an organic and/or aqueous-organic solvent solution.

Suitable organic solvents include volatile solvents which readily evaporate and dissolve the dimethylglyoxime. Suitable solvents include the lower-alkanols, e.g., methanol, ethanol, isopropanol, or mixtures thereof, especially methanol.

In order to prepare the aqueous impregnating solution (impregnating solution I), the following ingredients are dissolved in 100 ml. of water:

5–12 g. sodium thiosulfate
3–8 g. potassium fluoride
5–20 g. weak organic acids and the alkali-metal salts thereof, e.g. succinic acid and sodium succinate, and several milliliters (about 1–10 ml.) of a 10% aqueous NaOH or KOH solution
0–3 g. hydroxylammonium chloride.

The impregnating solution II contains about 0.1–1 g. of dimethylglyoxime in 100 ml. of an organic solvent or in a mixture of an organic solvent with water in a ratio of solvent to water being about 1:0 to 1:1.

The absorbent carriers, preferably filter paper, are successively impregnated with the impregnating solution or solutions in a conventional manner so as to provide a pickup of the solution of about 5–85%, preferably about 17–65%, calculated on the dry weight of the carrier. The impregnated papers can either be cut into handy strips, or they can be processed into preferably square pieces. They can then be conventionally glued onto plastic films, paper strips, or metallic strips, or sealed onto or into such films and strips.

The indicators of this invention, as they are used for the colorimetric determination of nickel ions, comprise an absorbent carrier uniformly impregnated (per m.$^2$ of surface area) with:

(a) 0.5–5 g., preferably 2–4 g., of dimethylglyoxime;
(b) 25–60 g., preferably 40–60 g., of an alkali-metal or ammonium thiosulfate;
(c) 15–40 g., preferably 30–35 g., of an alkali-metal fluoride;
(d) 25–100 g., preferably 50–75 g., of an acidic buffer, i.e., which buffers an aqueous solution applied to the composition at an acidic pH, preferably at about pH 6; and
(e) optionally, 0–15 g., preferably 5–10 g., of hydroxylammonium chloride.

In order to detect the presence of nickel ions in a test solution, these test strips are dipped into the solution to be examined until the testing zone is completely wetted and then removed. In the presence of nickle ions, the testing zone is colored pink to red. The shade of pink is compared with a standard color scale, e.g., after about 30 seconds to determine the nickel ion concentration of the solution.

In this semi-quantitative detection method, marked differences in the shade of the pink color can be observed between test solutions containing 10, 25, 50, 100, 250, and 500 mg./l. (or p.p.m.) nickel ions.

The novel indicator compositions are characterized by a very high selectivity and sensitivity. With them, it is possible to detect, with accuracy, 10 mg./l. of nickel ions. When the solution to be tested contains more than 500 mg./l. of nickel ions, an aliquot of the test solution should be diluted to a concentration such that a pink color lying within the color scale is obtained. By multiplying in accordance with the selected dilution, a semi-quanitative indication of the nickel ion concentration can thus be obtained.

The novel indicator compositions of this invention are very specific to nickel ions. The influence of other cations on the test is extremely minor. Thus, the indication procedure of this invention is not impaired by the presence of less than 1000 mg./l. of the following ions: $Ag^+$, $Al^{3+}$, $As^{3+}$, $Au^{3+}$, $Ba^{2+}$, $Be^{2+}$, $Bi^{3+}$, $Ca^{2+}$, $Cd^{2+}$, $Ce^{4+}$, $Cr^{3+}$, $Cu^{2+}$, $Fe^{2+}$, $Fe^{3+}$, $K^+$, $Li^+$, $Mg^{2+}$, $Mn^{2+}$, $Mo^{2+}$ to $Mo^{5+}$, $NH_4^+$, $Na^+$, $Pb^{2+}$, $Rb^+$, $Sb^{3+}$, $Sn^{2+}$, $Sr^{2+}$, $Ti^{4+}$, $Tl^+$, $VO^{2+}$, $Zn^{2+}$, or $Zr^{4+}$.

If the color produced in the testing zone deviates from the color scale, a waiting period of about one minute is allowed to elapse, whereupon the color is then compared with the color scale. If it is still not possible to correlate the colors in this manner, an impairment exists due to an extremely high concentration of foreign ions. In this case, the interfering ions must be masked by adding, to about 5 ml. of the solution to be tested, a pinch of a masking substance in an amount effective to mask the interfering ion, and generally between about 2 and 5%. For example, $Fe^{3+}$ is masked with potassium fluoride, $Cu^{2+}$ is masked with sodium thiosulfate, and $Hg^+$ and $Hg^{2+}$ are masked with sodium chloride. A disturbance caused by $Co^{2+}$ is eliminated by washing in about 10% ammonia solution. Molybdenum blue interferes with the test due to its inherent blue color. Therefore, this color should be eliminated by the addition of, for example, potassium permanganate crystals until the solution assumes a permanent pink color.

Thereafter, the solution should be decolorized with hydroxylammonium chloride, so that then the nickel ion concentration can be determined by means of the indicator of this invention.

The novel indicator is not very susceptible to an interference caused by the presence of anions. Only $CN^-$, $[Fe(CN)_6]^{3-}$, and $[Fe(CN)_6]^{4-}$ eliminate nickel ions from the detection process by forming nickel complexes.

The detection is not interfered with by less than 1000 mg./l., respectively, of $Br^-$, $BrO_3^-$, $Cl^-$, $ClO_3^-$, $ClO_4^-$, $CrO_4^{2-}$, $F^-$, $I^-$, $IO_3^-$, $IO_4^-$, $MnO_4^-$, $Mo_7O_{24}^{6-}$, $N_3^-$, $NO_2^-$, $NO_3^-$, $OCN^-$, $PO_4^{3-}$, $SCN^-$, $SO_3^{2-}$, $SO_4^{2-}$, $S_2O_3^{2-}$, $S_2O_4^{2-}$, $S_2O_5^{2-}$, $S_2O_8^{2-}$, $SeO_3^{2-}$, $VO_3^-$, $WO_4^{2-}$, acetate, ascorbate, succinate, tartrate, oxalate and citrate.

The novel indicator thus exhibits considerable advantages over the known indicators for nickel ions. For the first time, it is possible to conduct semi-quantitative determinations with very high selectivity and, surprisingly, the detection accuracy is independent of the pH of the solution to be tested over a very wide pH range.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Filter paper (No. 2316 of the firm Schleicher and Schull) is impregnated with solution I, dried, and thereafter impregnated with solution II and dried once again. The thus-obtained impregnated filter paper is then cut into small squares of about 5 x 5 mm. and glued onto plastic strips of 6 x 60 mm. at the lower end thereof.

Impregnating solution I contains:

12 g. sodium thiosulfate
8 g. potassium fluoride
10 g. succinic acid
3 g. hydroxylammonium chloride
100 ml. water
A few ml. of 10% NaOH to pH 6.

Impregnating solution II contains:

0.5 g. dimethylglyoxime
100 ml. methanol/water (1:1).

The test rod, after being dipped into a solution containing 10 mg./l. of nickel ions in addition to 4000 mg./l. of copper (II) and iron (III) ions, respectively, a pink color results which corresponds, according to the appropriate standard color scale, to a value of 10 mg./l. of $Ni^{2+}$.

EXAMPLE 2

Impregnating solutions are prepared in accordance with Example 1. Solution I contains, in addition to 3 g. of hydroxylammonium chloride and 10 g. of succinic acid, 6 g. of sodium thiosulfate and 4 g. of potassium fluoride. Solution II contains 0.1 g. of dimethylglyoxime. After being immersed into the testing solution described in Example 1, the indicator indicates a content of nickel ions of 10 mg./l.

EXAMPLE 3

Impregnating solutions are prepared in accordance with Example 1. However, solution I does not contain any hydroxylammonium chloride. Indicators produced with these impregnating solutions can be employed equally well for the semi-quantitative determinations of nickel ions, even in the presence of other metallic ions. However, the copper ion concentration must not range substantially above 4000 mg./l.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An indicator for the colorimetric detection of nickel ions consisting essentially of an absorbent carrier impregnated, per square meter of surface area, area:
    (a) 0.5–5 g. of dimethylglyoxime;
    (b) 25–60 g. of an alkali-metal or ammonium thiosulfate;
    (c) 15–40 g. of an alkali-metal fluoride; and
    (d) 25–100 g. of an acidic buffer effective to maintain a pH of 2–7 when the carrier is moistened with a test solution; and
    (e) up to 15 g. of hydroxylammonium chloride in an amount sufficient to exert a stabilizing effect on said thiosulfate.

2. A process for the colorimetric determination of nickel ions in aqueous solutions which comprises moistening an indicator of claim 1 with the aqueous solution to be tested.

3. An indicator according to claim 1, wherein the thiosulfate is sodium thiosulfate.

4. A process for the colorimetric determination of nickel ions in aqueous solutions which comprises moistening an indicator of claim 3 with the aqueous solution to be tested.

5. An indicator according to claim 1, wherein the fluoride is potassium fluoride.

6. A process for the colorimetric determination of nickel ions in aqueous solutions which comprises moistening an indicator of claim 5 with the aqueous solution to be tested.

7. An indicator according to claim 1, wherein the thiosulfate is sodium thiosulfate and wherein the fluoride is potassium fluoride.

8. A process for the colorimetric determination of nickel ions in aqueous solutions which comprises moistening an indicator of claim 7 with the aqueous solution to be tested.

9. An indicator according to claim 1, wherein the carrier is paper.

10. A process for the colorimetric determination of nickel ions in aqueous solutions which comprises moistening an indicator of claim 9 with the aqueous solution to be tested.

11. An indicator according to claim 9, wherein the thiosulfate is sodium thiosulfate and wherein the fluoride is potassium fluoride.

12. A process for the colorimetric determination of nickel ions in aqueous solutions which comprises moistening an indicator of claim 11 with the aqueous solution to be tested.

13. A method for preparing an indicator for the colorimetric detection of nickel ions which comprises impregnating an absorbent carrier with a solution or solutions consisting essentially of:
    (a) 0.1–1% of dimethylglyoxime;
    (b) 5–12% of an alkali-metal or ammonium thiosulfate;
    (c) 3–8% of an alkali-metal fluoride;
    (d) 5–20% of an acidic buffer; and
    (e) up to 3% of hydroxylammonium chloride, which method comprises the steps of applying to the absorbent carrier an aqueous solution or solutions of impregnating materials (b), (c), (d) and (e); drying the carrier; applying a solution of dimethylglyoxime in an organic solvent; and again drying the carrier.

14. A method according to claim 13, wherein the carrier is paper.

15. An indicator for the colorimetric detection of nickel ions consisting essentially of an absorbent paper impregnated, per square meter of surface area, with:
(a) 2.4 g. of dimethylglyoxime;
(b) 40–60 g. of an alkali-metal or ammonium thiosulfate;
(c) 30–35 g. of an alkali-metal fluoride;
(d) 50–75 g. of an acidic buffer effective to maintain a pH of 2–7 when the paper is moistened with a test solution; and
(e) up to 15 g. of hydroxylammonium chloride in an amount sufficient to exert a stabilizing effect on said thiosulfate.

References Cited

UNITED STATES PATENTS 2,452,036  10/1948  Clardy _____ 23—253 TP

OTHER REFERENCES

Oshchapovskii, V. V.: Analytical Abstracts, vol. 3, No. 3645 (1956).

Cheng, K. L.: Analytical Abstracts, vol. 5, No. 2116 (1958).

Merck Index, 7th edition, p. 541 (1963).

Peshkova, V. M. et al.: Analytical Abstracts, vol. 10, No. 4695 (1963).

Claassen, A. et al.: Analytical Abstracts, vol. 6, No. 4422 (1959).

Cheng, K. L.: Anal. Chem. 30, No. 2, February 1958, pp. 243–245.

MORRIS O. WOLK, Primary Examiner

R. M. REESE, Assistant Examiner

U.S. Cl. X.R.

252—408